US008557033B2

(12) United States Patent
Gröndahl et al.

(10) Patent No.: US 8,557,033 B2
(45) Date of Patent: Oct. 15, 2013

(54) POLYMERIC FILM OR COATING COMPRISING HEMICELLULOSE

(75) Inventors: Maria Gröndahl, Göteborg (SE); Lisa Bindgard, Göteborg (SE); Paul Gatenholm, Kullavik (SE); Thomas Hjertberg, Kungshamn (SE)

(73) Assignee: Xylophane AB, Bohus (SE)

( * ) Notice: Subject to any disclaimer, the term of this patent is extended or adjusted under 35 U.S.C. 154(b) by 575 days.

(21) Appl. No.: 12/527,070

(22) PCT Filed: Feb. 19, 2008

(86) PCT No.: PCT/SE2008/050191
§ 371 (c)(1),
(2), (4) Date: Jan. 14, 2010

(87) PCT Pub. No.: WO2008/103123
PCT Pub. Date: Aug. 28, 2008

(65) Prior Publication Data
US 2010/0129642 A1 May 27, 2010

(30) Foreign Application Priority Data
Feb. 19, 2007 (SE) ..................................... 0700404

(51) Int. Cl.
| C08L 1/00 | (2006.01) |
| C08L 3/00 | (2006.01) |
| C08L 5/00 | (2006.01) |
| C09D 101/00 | (2006.01) |
| C09D 103/00 | (2006.01) |
| C09D 105/00 | (2006.01) |
| C09J 101/00 | (2006.01) |
| C09J 103/00 | (2006.01) |
| C09J 105/00 | (2006.01) |
| C08K 3/34 | (2006.01) |
| C08K 9/04 | (2006.01) |
| D21H 19/58 | (2006.01) |
| C09C 1/42 | (2006.01) |

(52) U.S. Cl.
USPC ......... 106/162.1; 524/445; 524/446; 524/447

(58) Field of Classification Search
USPC ............. 524/445, 446, 447; 106/162.1, 217.9
See application file for complete search history.

(56) References Cited

U.S. PATENT DOCUMENTS

| 3,832,313 | A |   | 8/1974  | Reintjes |         |
|-----------|---|---|---------|----------|---------|
| 3,870,703 | A | * | 3/1975  | Gibney et al. | 536/70 |
| 5,358,559 | A |   | 10/1994 | Fitt |         |
| 6,004,616 | A |   | 12/1999 | Maeda |         |
| 6,146,750 | A | * | 11/2000 | Kotani et al. | 428/323 |
| 6,384,121 | B1| * | 5/2002  | Barbee et al. | 524/445 |
| 6,653,388 | B1| * | 11/2003 | Barbee et al. | 524/445 |
| 6,777,479 | B1| * | 8/2004  | Bernard et al. | 524/445 |
| 6,818,686 | B1| * | 11/2004 | Colpaert et al. | 524/17 |
| 7,211,613 | B2| * | 5/2007  | Lorah et a | 524/445 |
| 7,473,729 | B2| * | 1/2009  | Feeney et al. | 524/445 |
| 7,625,985 | B1| * | 12/2009 | Parker et al. | 525/446 |
| 8,080,297 | B2| * | 12/2011 | Kravitz et al. | 428/36.6 |
| 2002/0099125 | A1| * | 7/2002 | Akkapeddi et al. | 524/445 |
| 2004/0087696 | A1| * | 5/2004 | Gohil | 524/404 |
| 2005/0037064 | A1|   | 2/2005 | Basquin |         |
| 2005/0136259 | A1| * | 6/2005 | Mohanty et al. | 428/409 |
| 2006/0173104 | A1| * | 8/2006 | Gatenholm et al. | 524/35 |
| 2006/0211804 | A1| * | 9/2006 | Kim et al. | 524/445 |
| 2007/0059458 | A1| * | 3/2007 | Nishiura et al. | 428/1.31 |
| 2007/0093588 | A1| * | 4/2007 | Takahashi et al. | 524/445 |
| 2007/0213446 | A1| * | 9/2007 | Feeney et al. | 524/445 |
| 2007/0254160 | A1| * | 11/2007 | Kravitz et al. | 428/423.1 |

FOREIGN PATENT DOCUMENTS

| DE | 4331925 A1 | 3/1995 |
| DE | 19518247 A1 | 11/1996 |
| EP | 0612789 A1 | 8/1994 |
| EP | 1095977 A1 | 5/2001 |
| JP | 5230101 A | 9/1993 |
| JP | 07-309972 | 11/1995 |
| JP | 2006-520843 | 9/2008 |
| WO | 2004/083286 A1 | 9/2004 |
| WO | 2004083286 A1 | 9/2004 |

OTHER PUBLICATIONS

Buchanan et al., Carbohydrate Polymers 52, 2003, 345-357.*
Hartman, Jonas et al., Surface-and Bulk-Modified Galactoglucomannan Hemicellulose Films and Film Laminates for Versatile Oxygen Barriers, Biomacromolecules 2006, vol. 7.
Albertsson, Ann-Christine et al., Utilization of Hemicelluloses From Forestry Residual Streams as Barrier Film and Hydrogel Materials, 229th ACS National Meeting, American Chemical Society, Mar. 2005, San Diego, CA.

(Continued)

*Primary Examiner* — Liam Heincer
(74) *Attorney, Agent, or Firm* — Jeffrey S. Melcher; Manelli Selter PLLC

(57) ABSTRACT

A film forming composition and a polymeric film or coating comprising hemicellulose and at least one component selected from the group consisting of plasticizers, cellulose, and an oligomer or polymer, is disclosed, said polymeric film or coating further comprising at least one additive/reactant increasing the liquid/moisture resistance and mixed with and/or reacting with the hemicellulose and said at least one component before or in conjunction with the forming of the film or coating. The use of said film or coating is also disclosed. Further, a method for the manufacture of said polymeric film or coating is disclosed, as well as a method for improving the liquid/moisture resistance of hemicellulose. Said at least one additive/reactant increasing the liquid/moisture resistance is either a cross-linking agent or a hydrophobizing agent. In another preferred embodiment the additive is a 2:1 layered phyllosilicate. The additive forms a nanocomposite with the hemicellulose as a matrix. The hemicellulose/phyllosilicate nanocomposite reinforced material provides excellent liquid/moisture resistance. Heat treatment of all of the films increases their liquid/moisture resistance and reduces their oxygen permeability.

22 Claims, No Drawings

(56) References Cited

OTHER PUBLICATIONS

Grondahl, Maria et al., Material Properties of Plasticized Hardwood Xylans for Potential Application as Oxygen Barrier Films, Biomacromolecules 2004, vol. 5.
Fredon, E. et al., Hydrophonbic Films From Maize Bran Hemicelluloses, Carbohydrate Polymers 2002, vol. 49.
Grondahl, Maria et al., Gas-Phase Surface Fluorination of Arabinoxylan Films, Macromolecules 2006, vol. 39.
Heinze, Thomas et al., International Symposium on Xylans, Mannans and Other Hemicelluloses, American Chemical Society, 1st: 2002 Orlando, Fla., Distributed by Oxford University Press, 2004.
Moine, Charlotte et al., Chemical Valorization of Forest and Agriculture By-Products, Obtention, Chemical Characteristics, and Mechanical Behavior of a Novel Family of Hydrophobic Films, 2004, vol. B39, No. 4.
Hansen Natanya M.L. et al., Sustainable Films and Coatings From Hemicelluloses: A Review, Biomacromolecules, 2008, vol. 9, No. 6.
International Search Report and Written Opinion issued in parent PCT application.
Office Action issued Oct. 10, 2012 in corresponding Japanese Application No. 2009-549561.
European Search Report issued Jun. 5, 2013 in corresponding European Patent Application No. EP 08 71 2821.
Coma V. et. al., "Film properties from crosslinking of cellulosic derivatives with a polyfunctional carboxylic acid," Carbohydrate Polymers, Applied Science Publishers, Ltd., Barking, GB, vol. 51, No. 3. Feb. 15, 2003, pp. 265-271.

* cited by examiner

US 8,557,033 B2

POLYMERIC FILM OR COATING COMPRISING HEMICELLULOSE

CROSS-REFERENCE TO RELATED APPLICATIONS

This application is a national stage entry under 35 U.S.C. 371 of International Application No. PCT/SE2008/05091, filed 19 Feb. 2008, designating the United States. This application claims foreign priority under 35 U.S.C. 119 and 365 to Swedish Patent Application No. 0700404-7, filed 19 Feb. 2007.

TECHNICAL FIELD

The present invention relates to a film-forming composition and a polymeric film or coating comprising hemicellulose. It also relates to the use of said film or coating as an oxygen, aroma or grease barrier. Further, the invention relates to a method for the manufacture of a polymeric film or coating comprising hemicellulose, as well as to a method for improving the liquid/moisture resistance properties of hemicellulose.

BACKGROUND OF THE INVENTION

As disclosed in WO 2004/083286, the majority of plastic materials for packaging are today based on petroleum. However the fossil resources on the earth are limited. Incineration results in an increase of the greenhouse effect and furthermore these materials are in general not degradable. A sustainable development in the future requires a conversion to the use of renewable raw materials.

In many food packaging applications it is important to protect the food from oxygen as oxidation of aroma compounds, fatty compounds and vitamins due to the ingress of oxygen, reduces the quality and/or the flavor of the product. This can be done by using a barrier material, which has low permeability to oxygen. Furthermore, it is desirable that the material is flexible, mechanically resistant, transparent and of low cost. Also other barrier properties, such as aroma barrier and grease barrier can be of great importance.

Hemicelluloses are polysaccharides that are biosynthesized in the majority of plants, where they act as a matrix material present between the cellulose micro fibrils and as a linkage between lignin and cellulose. Hemicelluloses have been commercially used as sweetening agents, thickeners and emulsifiers in food. So far the non-food utilization of hemicelluloses has been very limited. For example, not until WO 2004/083286 have they been suggested to be used commercially for the preparation of polymeric materials for packaging.

As disclosed in WO 2004/083286, films and coatings based on hemicellulose are good oxygen barriers. WO 2004/083286 also describes a method to improve mechanical properties.

Hemicellulose interacts with liquid/moisture and the permeability of oxygen, aroma, and grease increases at high relative humidities. The water solubility of the material is an advantage in coating processes, but can be a draw-back for many packaging applications.

U.S. Pat. No. 5,498,662 and U.S. Pat. No. 5,621,026 and their European counterpart EP 649 870 as well as U.S. Pat. No. 5,897,960 and its counterpart EP 665 263 relate to a moisture resistant gas barrier film and to a process for producing the film, respectively, based on poly(meth)acrylic acid polymer (PMA) and a saccharide, and heat-treatment of the film. The saccharide preferably is a polysaccharide, such as starch. Xylan and arabinoxylan are mentioned, by the way, as heteropolysaccharides composed of only pentose. PMA is based on petroleum.

Further, US 2005/0070703 proposes a method for the production of a moisture resistant, biodegradable polysaccharide-based network by homocrystallization or hetero-crystallization of a mixture of at least one basic polysaccharide and at least one networking polysaccharide.

Thus, there is a need for new biodegradable film-forming compositions, which overcome the abovementioned problems, and which present the desired property of having low permeability to oxygen, grease and/or aroma.

SUMMARY OF THE INVENTION

Therefore, an object of the present invention is to provide flexible films or coatings for packaging based on hemicellulose and having an improved liquid/moisture resistance.

Another object is to provide a film-forming composition and films or coatings for packaging based on hemicellulose, which can be used as oxygen, aroma and/or grease barriers.

These objects are achieved by mixing hemicellulose with at least one component selected from the group consisting of plasticizers, cellulose and an oligomer or polymer, mixing and/or reacting the hemicellulose and said at least one component with at least one additive/reactant increasing the liquid/moisture resistance, and forming a film or coating thereof. The polymeric film or coating thereby formed can be used as an oxygen, aroma, or grease barrier, and said mixing or reacting is carried out before or in conjunction with the forming of the film or coating.

In a preferred embodiment, said at least one additive/reactant is a cross-linking agent or a hydrophobizing agent.

The polymeric film or coating suitably has a hemicellulose content in % by dry weight of 1-99%, preferably 30-90%, and most preferably 60-90%, and a content of cross-linking agent or hydrophobizing agent in % by dry weight of 0-30%, preferably 0-20%, more preferably 0-15%, especially 0-10%, and most preferably 0-5%.

In one advantageous embodiment, the agent is a cross-linking agent, and the cross-linking agent preferably is selected from the group consisting of cross-linking agents reacting or interacting with carboxyl and/or hydroxyl groups, especially from the group consisting of citric acid, boric acid, polyamidoamine-epichlorohydrin, ethylene acrylic acid copolymer, formaldehyde, glyoxal, zirconium carbonates, epichlorohydrin, phosphoric acid, and acrolein. Especially the addition of ammonium zirconium carbonate provides excellent liquid/moisture resistance properties to the hemicellulose film or coating.

In another advantageous embodiment, the agent is a hydrophobizing agent, preferably selected from the group consisting of acid anhydrides, rosin, alkenyl succinic anhydride, and alkyl keten dimer. The addition of an alkyl keten dimer provides excellent liquid/moisture resistance properties to the hemicellulose film or coating.

In a third advantageous embodiment, the agent is a 2:1 layered phyllosilicate, and the film is a nanocomposite material comprising nanoparticulate platelets with the hemicellulose as a matrix. Suitably, the 2:1 layered phyllosilicate is a clay mineral, and advantageously the clay mineral is selected from the smectite group. A 2:1 layered phyllosilicate has two tetrahedral sheets sandwiching a central octahedral sheet. The particles are platelet-shaped with a thickness of approximately 1 nanometer, i.e. they are nanoparticles. The additive forms a nanocomposite with the hemicellulose as a matrix.

The hemicellulose/phyllosilicate nanocomposite reinforced material provides excellent liquid/moisture resistance.

An advantage of the present invention is that the liquid/moisture resistance properties of the films or coatings produced can be improved by addition of cross-linking agents and/or hydrophobizing agents. Additionally, the liquid/moisture resistance may be improved and the oxygen transmission reduced by exposing the film or coating to a heat treatment, suitably for a time between 2 seconds and 20 minutes at a temperature between 80° C. and 180° C., and preferably between 120° C. and 160° C.

A further advantage is that the raw material in the present invention is renewable and can be extracted from biomass.

Materials based on biosynthesized polymers have several environmental advantages. After their use, these materials do not give rise to a net increase of carbon dioxide in the atmosphere and in addition most of them are biodegradable and as such can be disposed of by composting.

DETAILED DESCRIPTION OF PREFERRED EMBODIMENTS OF THE INVENTION

In the research work first leading to the invention disclosed in WO 2004/083286 and then to the present invention it was shown that coherent films based on hemicellulose, in particular pentosan-rich polysaccharides, e.g. xylans, exhibit excellent oxygen barrier properties.

Hemicelluloses are substituted/branched polymers of low to high molecular weight. They consist of different sugar units arranged in different portions and with different substituents. Pentosan-rich polysaccharides have a prevalent pentose content and constitute the largest group of hemicelluloses.

As used herein a "pentosan-rich polysaccharide" refers to a polysaccharide having a pentosan content of at least 20% by weight, and a xylose content of at least 20% by weight; for example, the polysaccharide has a pentosan content of 40% to 80% by weight, and a xylose content of 40% to 75% by weight.

Pentosan-rich polysaccharides, in particular xylans, are the most preferred compounds for use according to the present invention. However, other kinds of hemicelluloses may be used according to the invention, e.g. glucomannan, galactoglucomannan or arabinogalactan.

Xylans are present in biomass, such as wood, cereals, grass and herbs, and they are considered to be the second most abundant biopolymer in the plant kingdom. To separate xylans from other components in various sources of biomass, extraction with water and aqueous alkali can be used. Xylans are also commercially available from sources as Sigma Chemical Company.

Xylans may be divided into the sub-groups of heteroxylans and homoxylans. The chemical structure of homoxylans and heteroxylans differs. Homoxylans have a backbone of xylose residues and have some glucuronic acid or 4-O-methyl-glucuronic acid substituents. Heteroxylans also have a backbone of xylose residues, but are in contrast to homoxylans extensively substituted not only with glucuronic acid or 4-O-methyl-glucuronic acid substituents but also with arabinose residues. An advantage of homoxylans compared to heteroxylans is that homoxylans crystallize to a higher extent. Crystallinity both decreases gas permeability and moisture sensitivity.

An example of homoxylan which can be used according to the invention is glucuronoxylan.

Examples of heteroxylans which can be used according to the invention are arabinoxylan, glucuronoarabinoxylan and arabinoglucuronoxylan.

Xylans from any biomass or commercial source may be used to produce the films or coatings in the present invention.

A film-forming composition of hemicellulose, in particular xylans, may be achieved by various strategies. One way to do this is to add low molecular weight plasticizers. Another way to prepare coherent films is to add finely divided cellulose. A third procedure to obtain films is by blending xylan with other oligomers or polymers. An additional strategy to achieve better film-forming properties is to mix hemicelluloses of different molecular weights or structures. It is also possible to use a combination of one or more of the before mentioned strategies.

The films or coatings may be prepared by casting of an aqueous solution or dispersion of the pentosan-rich polysaccharide or by solution coating or dispersion coating of the pentosan-rich polysaccharide. Although other solvents could be used as solvents in the present invention, water is the most preferred solvent.

As used herein, the term "film" refers to a separate sheet or web having no carrier. However, as the film or coating has an improved liquid/moisture resistance and not is readily decomposable in the digestive system, it is not suitable for drug delivery systems.

As used herein, the term "coating" refers to a covering applied on a carrier, e.g. a web of cellulosic fibers, a sheet, or a film to provide a barrier layer.

The film or coating according to the invention may have a thickness of 100 μm or less. In particular, the film or coating may have a thickness of 50 μm or less, or more specifically the film or coating may have a thickness of 10 μm or less. Very thin films and coatings may be made according to the present invention. For example, the film or coating may have a thickness of 2 μm or 1 μm and still present the desired properties.

The expression "plasticizer" as used herein relates to a substance of low molecular weight, which increases the flexibility of the material. Examples of plasticizers that may be used are water, sugars such as glycerol, xylitol, sorbitol and maltitol, ethylene glycol, propylene glycol, butanediol, glycerine and urea.

Suitably, the content of plasticizer is in the range of 1 to 60% by dry weight, e.g. in the range of 20 to 50% by dry weight.

The cellulose added to improve the film-forming properties can originate from any biomass such as cotton, wood and agriculture residues or commercial source or be produced by bacteria. Preferably the cellulose is finely divided. Suitably, the content of finely divided cellulose is in the range of 1 to 90% by dry weight, e.g. in the range of 50 to 75% by dry weight.

As long as the main component of the film or coating is made from a biomass, the polymer or oligomer possibly added can be of any type. Thus, while a synthetic polymer or oligomer may be used, one that is based on biomass is preferred. For example, the polymer or oligomer added to obtain a coherent film is polyvinyl alcohol, starch or beta-glucan of various molecular weights. Suitably, the content of polymer or oligomer is in the range of 1 to 90% by dry weight, e.g. in the range of 20 to 75% by dry weight.

By the expression "oxygen barrier" used throughout this application is meant a material, which has low permeability to oxygen. The oxygen barrier can be used to protect a substance, e.g. food or medicals, from exposure to oxygen. However, it will be obvious to a person skilled in the art that the oxygen barrier of the present invention will bar the passage also of other gases, such as a protective atmosphere of nitrogen or carbon dioxide, which may be used inside a package for preserving food or medicals therein.

By the expression "aroma barrier" used throughout this application is meant a material, which has low permeability to aromatic substances. The aroma barrier can be used to protect a substance, e.g. food or medicals, from loosing taste and/or smell and from taking up taste and/or smell from the surrounding environment.

By the expression "grease barrier" used throughout this application is meant a material, which has low permeability to grease. The grease barrier can be used to protect a substance, e.g. food or medicals, from exposure to grease and to prevent that for example packaging material gets stained from grease in the product.

The polymeric films or coatings according to the present invention can be used as an oxygen barrier, aroma barrier and/or grease barrier in e.g. food packaging or pharmaceutical packaging. In addition, the films or coatings of the present invention can be used as an oxygen barrier, aroma barrier and/or grease barrier layer on e.g. paper, paperboard and plastics, possibly in combination with a water resistant material.

To increase the liquid/moisture resistance of the polymeric films or coatings according to the present invention, at least one additive/reactant increasing the liquid/moisture resistance is mixed with and/or reacted with hemicellulose. Improved liquid/moisture resistance may be detected either as reduced water solubility or as reduced oxygen permeability at high surrounding relative humidities (over 50% R.H.).

Further, to increase the liquid/moisture resistance of the polymeric films or coatings according to the present invention, at least one additive/reactant increasing the liquid/moisture resistance can be mixed with and/or reacted with the hemicellulose and at least one other component selected from the group consisting of plasticizers, cellulose and an oligomer or polymer. Normally, said additive/reactant is mixed with the other ingredients, but if desired, in some cases it can be added to the ready-made film or coating to create a surface layer with improved liquid/moisture resistance.

In one preferred embodiment, said at least one additive/reactant increasing the liquid/moisture resistance is a cross-linking agent, and the cross-linking agent is preferably selected from a group consisting of cross-linking agents reacting or interacting with carboxyl and/or hydroxyl groups. Cross-linking agents create a network. They can react with the hemicellulose polymer chains and bind them together or react with themselves and physically entrap the hemicellulose polymer chains. It can be an advantage if the cross-linking agent reacts with the hemicellulose polymer chains since the hemicellulose gets chemically bound in the network.

When the cross-linking agent reacts with the hemicellulose polymer chains different kinds of chemical bonds can be formed. In one preferred embodiment, the bonds formed are ionic bonds. In another preferred embodiment, the bonds formed are hydrogen bonds. In a more preferred embodiment, the bonds formed are covalent bonds, which are more stable than ionic and hydrogen bonds.

Examples of such cross-linking agents are citric acid, boric acid, polyamidoamine-epichlorohydrin, ethylene acrylic acid copolymer, formaldehyde, glyoxal, and zirconium carbonates. Other useful examples are epichlorohydrin, phosphoric acid, and acrolein. Especially the addition of ammonium zirconium carbonate provides excellent liquid/moisture resistance properties to the hemicellulose film or coating.

The polyamidoamine-epichlorohydrin may be Eka WS XO, which is a wet strength agent marketed by Eka Chemicals in Sweden, i.e. an additive for use in the paper-making stock to give paper increased strength in wet state. Similarly, the ammonium zirconium carbonate may be Eka AZC, marketed by Eka Chemicals in Sweden. AZC is an anionic hydroxylated zirconium polymer used in paper coating, paint and ink formulation, and metal surface treatment. In paper coating, it is used as an insolubilizer for latex-containing coated paper or board, and it also reduces print blanket dust and linting when used in uncoated papers.

In another preferred embodiment, said at least one additive/reactant increasing the liquid/moisture resistance is a hydrophobizing agent, such as acid anhydrides, rosin, alkenyl succinic anhydride, and alkyl keten dimer. Hydrophobizing agents react with the hemicellulose and make it less hydrophilic. The addition of an alkyl keten dimer provides excellent liquid/moisture resistance properties to the hemicellulose film or coating. The alkyl keten dimer may be Eka AKD, marketed by Eka Chemicals in Sweden, as an internal sizing agent, i.e. an additive to the papermaking stock to prevent the absorption and spreading of aqueous solutions in the paper.

The polymeric film or coating suitably has a hemicellulose content in % by dry weight of 1-99%, preferably 30-90%, and most preferably 60-90%, and a content of cross-linking agent or hydrophobizing agent in % by dry weight of 0-30%, preferably 0-20%, more preferably 0-15%, especially 0-10%, and most preferably 0-5%, said at least one additive/reactant is a cross-linking agent or a hydrophobizing agent.

The coatings according to the present invention can be applied onto substrates based on paper, paperboard and plastics.

An advantage in using biodegradable and/or renewable substrates is that the multilayer packaging material can be easily recycled by composting. The use of biodegradable and/or renewable substrates is further advantageous from an environmental point of view. Examples of biodegradable and/or renewable substrates are board, paper and biodegradable and/or renewable plastics such as polylactic acid, polyhydroxy alkanoates, starch-based plastics including derivatives of starch, cellulose-based plastics including derivatives of cellulose, biodegradable polyesters, polyesters based on renewable raw materials, etc.

We have found that one drawback with coating onto fiber-based substrates, such as paper and paperboard, is that the aqueous dispersion or solution penetrates into pores and liquid-absorbing fibers of the substrate. This brings on that a greater amount of solution or dispersion is needed to obtain a functional coating. Hemicellulose is interacting with cellulose/cellulosic fibers to a great extent, since they naturally occur together in plants and wood tissue.

One way to overcome the abovementioned problem is to make a pre-coating onto the porous and liquid-absorbing substrate, which reduces the penetration of solution or dispersion. Further the use of pre-coating can prevent formation of cracks in the coating.

Preferably the pre-coating reduces the porosity of the substrate. Examples of such materials are viscous polymer solutions or dispersions, such as cellulose derivatives, polyvinyl alcohol, starch, alginate and other polysaccharides. More preferably, the pre-coating also increases the hydrophobicity of the substrate. Examples of such materials are latex and thermoplastic resins.

Further, the coatings according to the present invention may be applied onto the substrate in existing industrial dispersion coating or solution coating processes. Dispersion coating or solution coating is a process commonly applied in paper and paperboard production. Coating onto paper and paperboard-based substrates may be advantageous since the process equipment for application is already available and no investment in new machinery or equipment is needed.

The heat treatment according to the present invention can be performed in association to the drying section of the dispersion coating or solution coating process. The heat treatment may be of short duration, such as corresponding to web speeds normally used in production. The temperature during heat treatment may correspond to temperatures normally used in production.

In still another preferred embodiment the additive is a 2:1 layered phyllosilicate, and the film is a nanocomposite material comprising nanoparticulate platelets with the hemicellulose as a matrix. A 2:1 layered phyllosilicate has two tetrahedral sheets sandwiching a central octahedral sheet. The particles are platelet-shaped with a thickness of approximately 1 nanometer, i.e. they are nanoparticles. The additive forms a nanocomposite with the hemicellulose as a matrix. The hemicellulose/phyllosilicate nanocomposite reinforced material provides excellent liquid/moisture resistance.

Suitably, the 2:1 layered phyllosilicate is a clay mineral, and advantageously the clay mineral is selected from the smectite group. Preferably, the 2:1 layered phyllosilicate is selected from the group of layered silicates like saponite, hectorite, bentonite, beidellite, nontronite or montmorillonite. Especially the addition of montmorillonite provides excellent liquid/moisture resistance.

The main problem faced during the nanocomposite preparation is the tendency of the nanoparticles/platelets to be in stack form. It is important to disintegrate these stacks to achieve an efficient improvement in material properties. Only low levels of nanoparticles/platelets are needed to observe significant improvement due to the large interface area between nanoparticles/platelets and polymer matrix.

Different strategies are used to disintegrate the stacks which involve physical and/or chemical treatments prior and/or during the integration of the nanoparticles/platelets in the hemicellulose.

In a first step, a 2:1 layered phyllosilicate is swollen in a polar solvent, e.g. water, under stirring, e.g. high shear stirring, other mechanical stirring or magnetic stirring, preferably high shear stirring. The swelling may be done at temperatures between 20 and 140° C., at a pressure above the boiling point at that temperature for the solvent, preferably between 80 and 100° C. The swelling time may be between 1 minutes and 24 hours, preferably between 15 minutes and 3 hours.

Secondly, a compound is intercalated/exfoliated in the swollen 2:1 layered phyllosilicate under stirring. Intercalation is the insertion of a molecule (or group) between two other molecules (or groups). For example, the selected compound intercalates between the stacked nanoparticles/platelets. Exfoliation is the process responsible for breaking up particle aggregates. The intercalation/exfoliation process temperature may be between 20 and 140° C. at a pressure above the boiling point at that temperature for the solvent, preferably between 80 and 100° C. The 2:1 layered phyllosilicate content of the nanocomposite film may be between 0.1 and 15 weight percent, preferably between 2 and 8 weight percent. The intercalation/exfoliation process time may be between 15 minutes and 8 hours.

The compound could also be added in the swelling step. A mixture of the compound and hemicellulose may also be intercalated/exfoliated in the swollen 2:1 layered phyllosilicate.

The compound is selected from a group of compounds, which have a strong affinity to the flakes, can bridge between flakes and is soluble in a polar solvent, e.g. polymers or oligomers. Especially, the compound is selected from the group consisting of polyethylene oxide (PEO), polyvinyl alcohol (PVOH), poly(vinylacetate-vinylalcohol) P(VAc-VOH), polyacrylic acid (PAA), polymethacrylic acid (PMAA), polyvinylpyrolidone (PVp), polyacrylic amide (PAAm) and polymethacrylic amide (PMAAm) and copolymers thereof or biopolymers, e.g. starch, β-glucan, cellulose derivatives and chitosan. Especially, the addition of polyvinyl alcohol (PVOH, alternative abbreviation PVA) facilitates the intercalation/exfoliation process and formation of a nanocomposite with excellent liquid/moisture resistance. The weight average molecular weight of the PVOH may be between 1 and 1000 kDa, most preferably between 10 and 300 kDa. The PVOH content of the nanocomposite film may be between 0 and 40 weight percent, preferably between 3 and 9 weight percent.

Hemicellulose is intercalated/exfoliated in the 2:1 layered phyllosilicate/compound mixture during stirring at a pressure above the boiling point at that temperature for the solvent. Preferably between 80 and 100° C. for 1 minute to 5 hours, preferably between 15 minutes and 3 hours. Hemicellulose may also be intercalated/exfoliated during the swelling or intercalated/exfoliated together with the compound during swelling.

The objects may also be achieved by subjecting the polymeric film to elevated temperatures, thus enhancing secondary forces between chains by eliminating entrapped water and promoting covalent cross linking between polymer chains. The heat treatment may vary between 2 seconds and 20 minutes and the treatment temperature may be between 80 and 180° C., preferably between 120 and 160° C.

If desired, the coated substrates according to the present invention can be further protected with a moisture barrier such as thermoplastic resins or wax. Examples thereof are polyesters, such as polyethylene terephthalate (PET); polyamides such as nylon; polyolefins such as low-density polyethylene, high-density polyethylene, linear low-density polyethylene, ethylene-vinyl acetate copolymers, polypropylene, ethylene-acrylic acid copolymers, ethylene-acrylic acid salt copolymers and ethylene-ethyl acrylate copolymers; polyvinyl chloride; polyvinylidene chloride; and polyphenylene sulfide. Also biodegradable and/or renewable plastics such as polylactic acid, polyhydroxy alkanoates, starch-based plastics including derivatives of starch, cellulose-based plastics including derivatives of cellulose, biodegradable polyesters, and polyesters based on renewable raw materials, etc can be used. Examples of waxes that can be used are natural and synthetic waxes. For multilayer structures according to the present invention where other biodegradable and/or renewable components are used, a biodegradable and/or renewable moisture barrier is preferred.

To improve the adhesion between the different layers, corona treatment can be used. The substrate may be corona treated prior to coating in a continuous process.

If desired, conventional additives that are known in the art can be included in the film coating of the present invention. For example, pigments, other colorants, stabilizers, adhesion promoters, preservatives, pH control agents, foam control agents, rheology modifiers, process aids and fillers can be included in the films and coatings of the present invention.

EXAMPLES

Examples 1-9 illustrate the production of the basic film or coating, while the examples 10-15 illustrate the addition of an additive/reactant increasing the liquid/moisture resistance and the properties obtained by the addition. The examples following thereafter illustrate the combination of xylan-based coatings with other materials. Especially, example 21 illustrates heat treatment of a xylan based film, and examples 22-24 illustrate embodiments where the additive is a 2:1 layered phyllosilicate.

Example 1

This example illustrates the production of a film based on xylan, where the film-forming properties have been improved using the low molecular plasticizer xylitol. A series of films containing 20%, 27.5%, 35%, 42.5%, and 50% of added xylitol (dry weight) were investigated. A mixture of xylitol and glucuronoxylan from aspen with a total weight of 1 g was solubilized in 35 ml of water in 95° C. for 15 minutes. The solution was then poured onto polystyrene Petri dishes with a diameter of 14 cm. After drying in 23° C. and 50% RH for two to three days, transparent and more or less flexible films were obtained.

The molar mass of the glucuronoxylan was measured using size exclusion chromatography with 0.05 M LiBr in DMSO: water (90:10) as the mobile phase. The following PSS (Polymer Standard Service) column set was used: GRAM 30, 100, 3000 (8×300 mm) and guard column (8×50 mm). The flow rate was 0.4 ml/min at 60° C., resulting in a system pressure of 58 bar. The samples were dissolved in the eluent in a shaker for 24 hours at room temperature and filtered using regenerated cellulose membranes (0.45 µm). An RI detector (Shodex RI-71), a two-angle laser light scattering detector (Precision detectors PD 2000) and a viscosimetric detector (Viscotek HSO2) were used for detection. The data were collected and calculated using WINGPC 6.0 software of PSS. Molar mass data were calculated from the viscosity and RI signals by universal calibration using pullulan standards (PSS). The obtained molar mass was 15,000 g/mol.

The mechanical properties of the films were measured using a tensile testing machine (Lloyd L2000R) with a load cell of 100 N capacity. The samples were cut into dog bone-shaped strips with a width of 1.5 cm. The thickness of the samples, measured with a micrometer, was 30 to 40 µm. The initial distance between the grips was 20 mm and the separation rate of the grips constant at 5 mm/min (Examples 1, 2, and 7) or 10 mm/min (Example 4). At least five replicates from each material were tested. For each sample the stress-strain curve was recorded and stress at break and strain at break were calculated.

The oxygen permeability of the films was measured with a Mocon Oxtran 2/20 equipment using a coulometric oxygen sensor. The area of the sample was 5 cm$^2$ and the analysis was performed in 50% R.H. The oxygen permeability was calculated from the oxygen transmission and the measured thickness of the films and is presented in units of (cm$^3$ µm)/(m$^2$ d kPa), where d=24 h.

The crystallinity of the films was investigated using wide angle x-ray scattering (WAXS). Films were milled to a fine powder using liquid nitrogen and the samples were investigated with a Siemens D5000 diffractometer. CuKα radiation was used with a wavelength of 1.54 Å. 2Θ was varied between 5° and 30°.

| Content of xylitol % | Stress at break MPa | Strain at break % | O$_2$-permeability (cm$^3$ µm)/(m$^2$ d kPa) |
|---|---|---|---|
| 20 | 39.4 | 2.1 | — |
| 27.5 | 15.2 | 2.5 | — |
| 35 | 10.6 | 5.3 | 1.10 |
| 42.5 | 4.8 | 7.8 | — |
| 50 | 3.0 | 8.0 | — |

The flexibility increased with increasing amount of added plasticizer. All films were semi-crystalline and the degree of crystallinity was little affected by the addition of xylitol. Normally, a decreased crystallinity results in reduced barrier properties.

The oxygen permeability of 1.10 (cm$^3$ µm)/(m$^2$ d kPa) shows that the film is a good oxygen barrier.

Example 2

This example illustrates the production of a film based on xylan, where the film-forming properties have been improved using the low molecular plasticizer sorbitol. The same procedure as in Example 1 was used except that sorbitol was used as plasticizer instead of xylitol and the series included three levels of plasticizers, namely 20%, 35% and 50% was investigated.

| Content of sorbitol % | Stress at break MPa | Strain at break % | O$_2$-permeability (cm$^3$ µm)/(m$^2$ d kPa) |
|---|---|---|---|
| 20 | 35.4 | 2.0 | — |
| 35 | 13.5 | 5.8 | 0.21 |
| 50 | 3.9 | 10.4 | — |

The flexibility of the films increased with increasing amount of sorbitol. The addition of sorbitol had only a minor effect on the relative crystallinity of the films. Normally, a decreased crystallinity results in reduced barrier properties.

The oxygen permeability of 0.21 (cm$^3$ µm)/(m$^2$ d kPa) shows that the film is a very good oxygen barrier.

Example 3

This example illustrates the production of films made from xylan and polyvinyl alcohol. The same procedure as in Example 1 was used, but 0.75 g of polyvinyl alcohol (mw 20,000) was mixed with 0.25 g of xylan. Flexible films were formed. The measured oxygen permeability of the films was 0.18 (cm$^3$ µm)/(m$^2$ d kPa), which shows that the film is a very good oxygen barrier.

Example 4

This example illustrates the production of films made from xylan and finely divided cellulose. 0.37 g of glucuronoxylan, solubilized in 20 ml of water in 95° C. for 15 minutes, was added to 1.13 g of bacterial cellulose homogenized in 120 ml of water. The blend was allowed to interact for 30 minutes. The resulting gel was poured onto a polystyrene Petri dish with a diameter of 14 cm, and dried at 50° C. for 48 h. After drying, a flexible film was obtained. The films produced according to this method exhibited a stress at break of 102.8 MPa, which shows that the cellulose reinforces the film. The strain at break was 3.1% and the oxygen permeability of 0.225 (cm$^3$ µm)/(m$^2$ d kPa) shows that the film is a very good oxygen barrier.

Example 5

This example illustrates the production of a film based on xylan, where the xylan is obtained from an agricultural residue, such as oat spelts, barley husks or flax. 1 g of arabinoxylan was solubilized in 35 ml of water in 95° C. for 15 minutes. The solution was then poured onto a polystyrene Petri dish with a diameter of 14 cm. After drying in 23° C. and 50% R.H. for two to three days flexible films were obtained.

In this case, water is the preferred plasticizer. The possibility of obtaining films of arabinoxylan without the addition of any other plasticizer than water is very advantageous and a surprising aspect of the present invention.

The thickness of the films, measured with a micrometer, was 30-40 μm.

The molar mass of the arabinoxylan was measured using size exclusion chromatography as described in Example 1. The obtained molar mass was 34,000 g/mol.

The oxygen permeability of the film was 0.19 $(cm^3\ \mu m)/(m^2\ d\ kPa)$, where d=24 h, which is a low value that indicates a very good barrier.

Example 6

This example illustrates the production of a coating based on xylan. A mixture of 0.105 g sorbitol and 0.195 g glucoronoxylan from aspen was solubilized in 30 ml of water in 95° C. for 15 minutes. The solution was then poured onto a plastic film in a polystyrene Petri dish with a diameter of 14 cm. After drying in 23° C. and 50% RH for two to three days, a coating of xylan on the plastic film was obtained.

The molar mass of the glucuronoxylan was measured using size exclusion chromatography as described in Example 1. The obtained molar mass was 15,000 g/mol.

The thickness of the coating was obtained by subtracting the thickness of the plastic film from the thickness of the plastic film with the xylan coating, measured using a micrometer. The obtained thickness of the coating was 1 μm. In this example, a thin coating based on xylan was successfully made. To be able to produce thin coatings is important in many industrial applications.

Example 7

This example illustrates the production of a film based on glucomannan, where the film-forming properties have been improved using the low molecular plasticizer sorbitol. Films without sorbitol and films containing 20% of added sorbitol (dry weight) were investigated. A mixture of sorbitol and glucomannan with a total weight of 0.2 g was solubilized in 20 ml of water in 95° C. for 15 minutes. The solution was then poured onto polystyrene Petri dishes with a diameter of 9 cm. After drying in 23° C. and 50% RH for two to three days, transparent and more or less flexible films were obtained.

The mechanical properties of the films were measured according to Example 1. The thickness of the samples, measured with a micrometer, was 60-70 μm.

| Content of sorbitol % | Stress at break MPa | Strain at break % |
|---|---|---|
| 0 | 20.3 | 2.7 |
| 20 | 7.2 | 6.8 |

The flexibility increased with addition of plasticizer.

Example 8

This example illustrates the production of a film based on arabinoxylan from barley husks, where the xylan has a high molar mass, above 50.000 g/mol. 1 g of arabinoxylan was solubilized in 35 ml of water in 95° C. for 15 minutes. The solution was then poured onto a polystyrene Petri dish with a diameter of 14 cm. After drying in 23° C. and 50% R.H. for two to three days flexible films were obtained.

In this case, water is the preferred plasticizer. The possibility of obtaining films of arabinoxylan without the addition of any other plasticizer than water is very advantageous and a surprising aspect of the present invention.

The thickness of the films, as measured with a micrometer, was 30-40 μm.

The molar mass of the arabinoxylan was measured using size exclusion chromatography in an aqueous system. The obtained molar mass was 73,900 g/mol.

The oxygen permeability of the film was 0.45 $(cm^3\ \mu m)/(m^2\ d\ kPa)$, where d=24 h, and shows that the film is a very good oxygen barrier.

In the following examples, the main ingredient in the films was xylan from barley husks, unless otherwise indicated. Two different reference films were used, pure xylan film and xylan film containing an addition of 30% sorbitol.

Further, the temperature during the addition/reaction of the additive/reactant was maintained between 0 and 300° C., preferably between 20 and 100° C. for less than one hour, preferably less that 10 minutes, more preferably corresponding to web speeds normally used in production, and the content of the additive/reactant used to increase the liquid/moisture resistance in % by dry weight was 0-30%, preferably 0-20%, more preferably 0-15%, especially 0-10%, and most preferably 0-5%.

Example 9

The solubility of the reference films (without cross-linking or hydrophobizing agent) of xylan was tested by cutting a 30-40 μm thick film into square pieces, 5×5 mm, and immersing them in Milli-Q® water of room temperature in a test tube in a shaking apparatus. Reference films with only water as plasticizer were completely solubilized after 37 seconds. Reference films with 30% sorbitol as plasticizer were solubilized after 23 seconds. These are very short times that will affect the possibility to use these materials in applications under humid conditions.

Oxygen transmission rate measurements were made at 83% R.H., i.e. a very high moisture content and the oxygen permeability was calculated from the oxygen transmission rate and the thickness of the samples.

A reference film of barley husk arabinoxylan had an oxygen permeability of 500.4 $(cm^3\ \mu m)/(m^2\ d\ kPa)$, where d=24 h and 381.2 $(cm^3\ \mu m)/(m^2\ d\ kPa)$, whe d=24 h in two measurements.

Example 10

This example illustrates the use of citric acid (CA) as cross-linking agent. The films were heat treated for 8 minutes. The solubility of the films is shown in the table below.

| Sample | Heat treatment | Dissolution time |
|---|---|---|
| 1% CA | 180° C. | 34 min. 30 s. |
| 5% CA | 180° C. | >72 h. |
| 10% CA | 80° C. | 2 h. 30 min. |
| 10% CA | 110° C. | 3 h. 3 min. |
| 10% CA | 140° C. | >72 h. |
| 10% CA | 180° C. | >72 h. |

These results show that the liquid/moisture resistance of the films as compared to the reference films is greatly improved. The positive effect is larger for higher amounts of CA and higher temperatures during the heat treatment.

Example 11

This example illustrates the use of boric acid (BA) as cross-linking agent. The films were heat treated for 8 minutes. The solubility of the films is shown in the table below.

| Sample | Heat treatment | Dissolution time |
| --- | --- | --- |
| 1% BA | 180° C. | 47 s. |
| 5% BA | 180° C. | 7 min. |
| 10% BA | 80° C. | 28 min. |
| 10% BA | 110° C. | 28 min. |
| 10% BA | 140° C. | 29.5 min. |
| 10% BA | 180° C. | 2 h. 2 min. |

These results show that the liquid/moisture resistance of the films as compared to the reference films is greatly improved. The positive effect is larger for higher amounts of BA and higher temperatures during the heat treatment.

Example 12

This example illustrates the use of polyamidoamine-epichlorohydrin (PAAE) as cross-linking agent. Eka WS XO was tested. The films were heat treated for 30 minutes. The solubility of the films is shown in the table below.

| Sample | Heat treatment | Dissolution time |
| --- | --- | --- |
| 0.5% PAAE | 105° C. | 13 min. |
| 1% PAAE | 105° C. | 19 min. 30 s. |
| 2% PAAE | 105° C. | 2 h. |
| 5% PAAE | 105° C. | 2 h. 45 min. |

These results show that the liquid/moisture resistance of the films as compared to the reference films is greatly improved. The positive effect is larger for higher amounts of PAAE. It is a great advantage that fairly low temperatures can be used during the heat treatment.

Example 13

This example illustrates the use of ammonium zirconium carbonate (AZC) as cross-linking agent. Eka AZC was tested. The films were heat treated for 1 minute. The solubility of the films is shown in the table below.

| Sample | Heat treatment | Dissolution time |
| --- | --- | --- |
| 0.5% AZC | 100° C. | 50 h. |
| 5% AZC | 100° C. | 170 h. |
| 10% AZC | 100° C. | 340 h |
| 20% AZC | 100° C. | >770 h |

These results show that the liquid/moisture resistance of the films as compared to the reference films is greatly improved. The positive effect is larger for higher amounts of AZC, but even small amounts of AZC give a very good effect. It is a great advantage that fairly low temperatures can be used during the heat treatment and still a very large effect on the liquid/moisture resistance is observed.

Example 14

This example illustrates the use of different cross-linking agents and hydrophobizing agents and their effect on oxygen permeability.

Oxygen transmission rate measurements were made at 80% R.H., i.e. a high moisture content and the oxygen permeability was calculated from the oxygen transmission rate and the thickness of the samples.

The measurement at 80% R.H. is carried out in the same way as the one at 50% R.H. The film is conditioned until the moisture content has reached equilibrium, and then the oxygen transmission rate through the film is measured while maintaining an ambient moisture content of 80% R.H.

Oxygen permeabilities at 80% R.H., 23° C.:

| Sample | $O_2$-permeability $(cm^3 \mu m)/(m^2 \, d \, kPa)$ |
| --- | --- |
| Xylan with 5% CA | 76.4 |
|  | 82.1 |
| Xylan with 1% AKD* | 64.5 |
|  | 62.8 |
| Xylan with 1% PAAE | 67.6 |
|  | 62.0 |
| Xylan with 10% AZC | 11.0 |
|  | 12.0 |

*concerning AKD, a hydrophobizing agent, see Example 15.

The results show that the addition of CA, AKD and PAAE all decrease the oxygen permeability of the xylan films at high relative humidities as compared to the reference films (see Example 9). However, the addition of AZC gives an extremely good and a surprising effect.

Example 15

This example illustrates the use of alkyl keten dimer (AKD) as hydrophobizing agent. Three contents of Eka AKD were tested, with and without sorbitol. The contents tested are 0.5%, 1%, and 1.5% AKD. The films that were plasticized with sorbitol contained 30% sorbitol. The films were heat treated at 20-100° C. for 0.5-30 minutes.

In the solubility test, most of the samples did not break in the shaking machine for more than three hours and they were not dissolved after being left in water for several days. Half of the tested samples contained sorbitol, but no difference in the dissolution times between samples with and without sorbitol was observed during the test.

Example 16

This example illustrates the production of a xylan-based coating onto polyethylene terephthalate (PET) and shows that xylan can successfully be combined with plastic films for multilayer packaging applications. A mixture of arabinoxylan and sorbitol in a ratio of 7:3 was solubilized in water at 95° C. for 30 minutes. The dry content of the solution was 12.5%. The solution was coated onto PET-film (Mylar 800, 36 μm) using a wire-wound meter bar (K Control Coater). The coating was dried with IR for one to two minutes.

The coat weight was obtained by subtracting the surface weight of pure PET-film from the surface weight of coated PET-film. The dry coat weight was 5 g/m².

The oxygen permeability of the coating was 0.32 $(cm^3 \mu m)/(m^2 \, d \, kPa)$, which is a very good barrier.

Example 17

This example illustrates the production of a xylan-based coating onto a pre-coated substrate consisting of paperboard (Invercoat Creato, Iggesund Paperboard) and further the production of multilayer material for packaging. The multilayer material can be used for board based packaging in dry and wet applications. The coating was performed using an electrical laboratory coater (K202 Control Coater) with wire-wound meter bars giving varying wet coat weights. A pre-coating of latex (styrene butadiene latex from Ciba) was coated onto the board and dried for one minute using IR. The dry coat weight of the pre-coating was 9 g/m². A mixture of arabinoxylan and sorbitol in a ratio of 7:3 was solubilized in water at 95° C. for 30 minutes. The dry content of the solution was 12.5%. The solution was coated onto the pre-coated substrate and dried for two minutes using IR. The dry coat weight of the xylan-based coating was 5 g/m². Low density polyethylene was extruded onto both sides of the coated substrate in a pilot coating equipment. The coat weight of low density polyethylene was 40 g/m²/side.

The oxygen transmission rate of the obtained multilayer material was 0.6 cm³/(m² day atm), which is a very good barrier. The oxygen transmission rate is measured in "cc" units (i.e. cm³/m² 24 h atm, measured with 100% $O_2$). If desired, the measured value may be converted to permeability by converting atm to kPa and taking the thickness of the film/coating into account. If 5 cc, for example, is measured for a 40 μm thick film, the permeability is $(5/101.325) \times 40 = 1.97$ (cm³ μm)/(m² d kPa), where d=24 h.

Example 18

This example illustrates the production of a xylan-based coating onto a corona treated substrate consisting of polyethylene terephthalate (PET), low density polyethylene (LDPE) or polypropylene (PP) and further the evaluation of the effect of the corona treatment on adhesion. The coating was made using a wired wound meter bar giving a wet coating of 100 μm. Prior to coating, the substrates were treated with a FG-2 Ahlbrandt corona system with 2.5 A at a speed of 10 m/min and an output voltage of 56 V. The electrodes were at a distance of 1.8 mm from each other. A mixture of arabinoxylan and sorbitol in a ratio of 7:3 was solubilized in water at 95° C. for 30 minutes. The dry content of the solution was 12.5%. The solution was coated onto the corona treated substrate and dried for two minutes using IR. The adhesion between the substrate and the coating was evaluated with a tape test and compared with coatings onto the same substrate that had not been corona treated. Ten measurements were made for each sample. A piece of tape was attached to the surface of the coating and pulled rapidly at an angle of 90 degrees. Either the coating was unaffected and the result was then "passed" or the coating was detached from the substrate and then the result was "failed". The results are summarized in the table below.

| Substrate | Tape test, without corona treatment | Tape test, after corona treatment |
|---|---|---|
| PET | 7 "passed", 3 "failed" | 10 "passed" |
| LDPE | 10 "failed" | 6 "passed", 4 "failed" |
| PP | 10 "failed" | 9 "passed", 1 "failed" |

The results show that the adhesion to various plastic materials is greatly improved by corona treatment and that corona treatment can be successfully used when combining xylan-based coatings and different plastic materials.

Example 19

This example illustrates the production of a xylan-based coating onto a substrate consisting of polyethylene-coated paper. A mixture of arabinoxylan and sorbitol in a ratio of 7:3 was solubilized in water at 95° C. for 30 minutes. The dry content of the solution was 12.5%. The solution was coated onto the substrate using a wire-wound meter bar (K Control Coater). The coating was dried with IR for one to two minutes. The obtained dry coat weight was 7 g/m².

The grease barrier properties of the coated substrate was evaluated and compared to a non-coated substrate. A droplet of essential oil (also known as volatile oil and ethereal oil) was placed onto the front side of coated and non-coated substrates (xylan-coated and polyethylene-coated side, respectively) and the samples were placed in an oven at 70° C. The formation of grease stains on the reverse sides of the samples was observed. For the non-coated substrate, grease stains were formed after two minutes. After 60 minutes the test was interrupted and no grease stains could be observed on the coated substrate. The essential oil was used to simulate greasy and aromatic compounds, like for example spices.

The coated substrate was further used for production of bags, which were filled with aromatic spices. The transmission of aromatic compounds was observed by smelling. The smell was considerably reduced for bags based on coated substrate as compared to bags based on non-coated substrates.

This example shows that xylan-based coatings can be successively used for packaging of greasy and aromatic products.

Example 20

This example illustrates the production of a xylan-based coating onto a substrate consisting of paperboard (liquid carton board, Stora Enso). A mixture of arabinoxylan and glycerol in a ratio of 8:2 was solubilized in water at 95° C. for 30 minutes. The dry content of the solution was 10%. The solution was coated onto the substrate using a wire-wound meter bar (K Control Coater). The coating was dried using IR for one to two minutes. The obtained dry coat weight was 25 g/m².

The grease barrier properties were evaluated according to the kit test (TAPPI T559). The grease barrier properties of the coated substrate were of level 12, the highest level. The non-coated substrate showed no grease barrier properties and failed at level 0, the lowest level.

Example 21

This example illustrates the use of heat treatment to enhance the liquid/moisture resistance and to reduce the oxygen permeability of xylan films and coatings. The film was treated at 140° C. for 10 minutes in a forced circulation oven. The liquid/moisture resistance and oxygen permeability is shown in the table below.

The liquid/moisture resistance of the films was determined with a fragment size test by cutting 60 to 80 μm thick film into square pieces, 5×5 mm, and immersing them in Milli-Q water of room temperature in a test tube in a shaking apparatus. The fragment size is given as the characteristic length after a specific time in the shaking apparatus.

The film was treated at 140° C. for 10 minutes in a forced circulation oven. The liquid/moisture resistance and oxygen permeability is shown in the table below.

| Sample | Fragment size [mm] after 2 minutes | OP [(cm³ μm)/ (m² day kPa)] at 80% RH and 23° C. |
|---|---|---|
| Xylan film | 1.5 | 59.6 |
| Heat treated xylan film | 3 | 49.7 |

The results show that heat treatment of the film or coating may be used to improve liquid/moisture resistance and reduce the oxygen permeability of xylan films.

Example 22

This example illustrates the use of montmorillonite as a nanocomposite reinforcement in xylan films and coatings. It also illustrates the use of polyvinyl alcohol (PVOH) as the compound and the effect of its molecular weight. Montmorillonite is swollen in water at 25° C. as a 1% suspension for 24 hours under high shear stirring. Polyvinyl alcohol (PVOH) in a water solution is intercalated in the montmorillonite for 4 hours at 90° C. under magnetic stirring. Xylan and sorbitol are dispersed in the PVOH/montmorillonite solution. The proportion of components in the film was xylan:montmorillonite:PVOH:sorbitol 1:0.11:0.1:0.3 Two different molecular weights of PVOH were used, 45 and 85-124 kDa The liquid/moisture resistance is shown in the table below.

| Sample | Fragment size [mm] after 2 minutes |
|---|---|
| Xylan film | 1.5 |
| Xylan/montmorillonite composite film, PVOH $M_w$ = 45 kDa | 3 |
| Xylan/montmorillonite composite film, PVOH $M_w$ = 85-124 kDa | 5 |

These results show that montmorillonite in combination with PVOH may be used to improve liquid/moisture resistance in xylan films and coatings. An increase of molecular weight of the PVOH favors this improvement.

Example 23

This example illustrates the use of montmorillonite as a nanoreinforcement in xylan films or coatings in combination with heat treatment of the film or coating. Montmorillonite is swollen in water at 25° C. for 24 hours under high shear stirring. Polyvinyl alcohol (PVOH) ($M_w$ 146-186 kDa) in a water solution is intercalated in the montmorillonite for 4 hours at 90° C. under magnetic stirring. Xylan and sorbitol are dispersed in the PVOH/montmorillonite suspension. The proportion of components in the film was xylan:montmorillonite:PVA:sorbitol 1:0.11:0.1:0.3. Two films were heat treated at 140° C. for 10 minutes in a forced circulation oven. The liquid/moisture resistance and oxygen permeability are shown in the table below.

| Sample | Fragment size [mm] after 2 minutes | OP [(cm³ μm)/ (m² day kPa)] at 80% RH and 23° C. |
|---|---|---|
| Xylan film | 1.5 | 59.6 |
| Heat treated xylan film, | 3 | 49.7 |
| Xylan/montmorillonite composite film | 3 | 31.5 |
| Heat treated xylan/montmorillonite composite film | 5 | 24.7 |

The result shows a synergistic effect between the use of montmorillonite as a nanoreinforcement and the heat treatment to enhance the liquid/moisture resistance and reduce the oxygen permeability of xylan films and coatings.

Example 24

This example illustrates the use of montmorillonite as nanoreinforcement in xylan films and coatings and the effect of the addition of polyvinyl alcohol. Montmorillonite is swollen in water at 25° C. for 24 hours under high shear stirring. Polyvinyl alcohol (PVOH) ($M_w$=146-186) in a water solution is intercalated in the montmorillonite for 4 hours at 90° C. under magnetic stirring. Xylan and sorbitol are dispersed in the PVOH/montmorillonite suspension. The proportions of components in the films xylan:montmorillonite:PVA:sorbitol were 1:0.11:0.1:0.3 and 1:0.11:0.05:0.3. The films were heat treated at 140° C. for 10 minutes in a forced circulation oven. The liquid/moisture resistance and oxygen permeability are shown in the table below.

| Sample | Fragment size [mm] after 3 hours | OP [(cm³ μm)/ (m² day kPa)] at 80% RH and 23° C. |
|---|---|---|
| Heat treated xylan/montmorillonite composite film. 3.4 weight percent PVOH. | 1.5 | 28.6 |
| Heat treated xylan/montmorillonite composite film. 6.6 weight percent PVOH. | 3.0 | 24.7 |

These results show that an increase in the amount of PVOH results in an increase in the liquid/moisture resistance and reduction in oxygen permeability in xylan/montmorillonite nanocomposite films and coatings.

INDUSTRIAL APPLICABILITY

An advantage of the present invention is that the film or coating is biodegradable, which facilitates recycling.

A further advantage is that the material is based on renewable resources, which is favorable from an environmental point of view.

A further advantage is that the films or coatings according to the present invention are based on renewable resources, which can be extracted from low value by-products from wood and agricultural residues. The films and coatings therefore have a great potential to be cost efficient in large scale production volumes.

The price of crude oil has increased a lot lately and is expected to increase even further in the future. This has further led to a great increase of prices of synthetic plastic materials. Since the films and coatings according to the present invention are based on renewable resources they are less sensitive to oil prices and the cost efficiency can be even more important in the future.

The invention claimed is:

1. A renewable liquid/moisture resistant polymeric film or coating for packaging comprising:
   hemicellulose extracted from biomass;
   at least one component to improve film-formability, the component selected from the group consisting of plasticizers, cellulose, an oligomer, and a polymer; and at least one agent to increase the liquid/moisture resistance of the film, the agent comprising nanoparticulate platelets of a 2:1 layered phyllosilicate in the hemicellulose as a matrix, wherein:
   the component includes a plasticizer comprising a polyol, and an amount of the plasticizer is between 20% and 50% by weight of the hemicellulose;
   the at least one agent to increase the liquid/moisture resistance includes a crosslinking agent in an amount between 0.5 and 5% by weight of the hemicellulose, the crosslinking agent including polyamidoamine-epichlorohydrin; and
   the 2:1 layered phyllosilicate comprises montmorillonite in an amount between 2 and 8 weight percent of the film or coating.

2. A liquid/moisture resistant polymeric film or coating according to claim 1, wherein said at least one agent further comprises a hydrophobizing agent.

3. A liquid/moisture resistant polymeric film or coating according to claim 2, wherein said film or coating has a hemicellulose content in % by dry weight of 1-99% a plasticizer in an amount between 20% and 50% of the hemicellulose content, and a cross-linking agent in % by dry weight of 0-30%.

4. A liquid/moisture resistant polymeric film or coating according to claim 3, wherein the cross-linking agent is selected from the group consisting of cross-linking agents that react with carboxyl and/or hydroxyl groups.

5. A liquid/moisture resistant polymeric film or coating according to claim 2, further comprising a hydrophobizing agent selected from the group consisting of acid anhydrides, rosin, alkenyl succinic anhydride, and alkyl keten dimer.

6. A liquid/moisture resistant polymeric film or coating according to claim 2, wherein said film or coating has a hemicellulose content in % by dry weight of 30-90% and at least one of a cross-linking agent and a hydrophobizing agent in % by dry weight of 0-15%.

7. A liquid/moisture resistant polymeric film or coating according to claim 2, wherein said film or coating has a hemicellulose content in % by dry weight of 60-90%, and a content of at least one of a cross-linking agent and a hydrophobizing agent in % by dry weight of 0-5%.

8. A liquid/moisture resistant polymeric film or coating according to claim 1, wherein said 2:1 layered phyllosilicate comprises a clay mineral.

9. A liquid/moisture resistant polymeric film or coating according to claim 8, wherein said clay mineral is selected from the smectite group.

10. A liquid/moisture resistant polymeric film or coating according to claim 1, wherein the 2:1 layered phyllosilicate content is between 0.1 and 15 weight percent.

11. A liquid/moisture resistant polymeric film or coating according to claim 1, further comprising at least one compound from a group of compounds that have a strong affinity to the platelets, can bridge between the platelets, and are soluble in a polar solvent, is intercalated or exfoliated in the 2:1 layered phyllosilicate.

12. A liquid/moisture resistant polymeric film or coating according to claim 11, wherein said compound comprises at least one selected from the group consisting of polyethylene oxide (PEO), polyvinyl alcohol (PVOH), poly(vinylacetate-vinylalcohol) P(VAc-VOH), polyacrylic acid (PAA), polymethacrylic acid (PMAA), polyvinylpyrolidone (PVp), polyacrylic amide (PAAm) and polymethacrylic amide (PMAAm), a biopolymer, and copolymers thereof.

13. A liquid/moisture resistant polymeric film or coating according to claim 12, wherein said compound comprises polyvinyl alcohol (PVOH) having a weight average molecular weight between 1 and 1000 kDa, and wherein the polyvinyl alcohol (PVOH) content in the nanocomposite film or coating is up to 40 weight percent.

14. A liquid/moisture resistant polymeric film or coating according to claim 12, wherein said compound includes polyvinyl alcohol (PVOH) having a weight average molecular weight between 10 and 300 kDa, and wherein the polyvinyl alcohol (PVOH) content in the nanocomposite film or coating is between 3 and 9 weight percent.

15. A liquid/moisture resistant polymeric film or coating according to claim 1, wherein the 2:1 layered phyllosilicate content of the film or coating is between 2 and 8 weight percent.

16. The liquid/moisture resistant polymeric film or coating according to claim 1, wherein said 2:1 layered phyllosilicate comprises at least one layered silicate selected from the group of saponite, hectorite, bentonite, beidellite, and nontronite.

17. A renewable packaging material comprising:
   a paper board substrate coated with a polymeric film or coating according to claim 1.

18. A method comprising using the polymeric film or coating of claim 1 as any of an oxygen, aroma or grease barrier.

19. A method comprising:
   providing a liquid/moisture resistant polymeric film or coating comprising hemicellulose extracted from biomass;
   at least one component to improve film-formability, the component selected from the group consisting of plasticizers, cellulose, an oligomer, and a polymer; and at least one agent to increase the liquid/moisture resistance of the film, the agent comprising nanoparticulate platelets of a 2:1 layered phyllosilicate in the hemicellulose as a matrix, wherein:
   the component includes a plasticizer comprising a polyol, and an amount of the plasticizer is between 20% and 50% by weight of the hemicellulose;
   the at least one agent to increase the liquid/moisture resistance includes a crosslinking agent in an amount between 0.5 and 5% by weight of the hemicellulose, the crosslinking agent including polyamidoamine-epichlorohydrin; and
   the 2:1 layered phyllosilicate comprises montmorillonite in an amount between 2 and 8 weight percent of the film or coating, and
   using the polymeric film or coating as any one of an oxygen, aroma or grease barrier.

20. A method for the manufacture of a polymeric film or a coating comprising:
   mixing hemicellulose extracted from biomass with:
   at least one component to improve film-formability, the component selected from the group consisting of plasticizers, cellulose an oligomer and a polymer; and at least one agent to increase the liquid/moisture resistance of the film, the agent comprising nanoparticulate platelets of a 2:1 layered phyllosilicate in the hemicellulose as a matrix, wherein:
the component includes a plasticizer comprising a polyol, and an amount of the plasticizer is between 20% and 50% by weight of the hemicellulose;
the at least one agent to increase the liquid/moisture resistance includes a crosslinking agent in an amount between 0.5 and 5% by weight of the hemicellulose, the crosslinking agent including polyamidoamine-epichlorohydrin; and
the 2:1 layered phyllosilicate comprises montmorillonite in an amount between 2 and 8 weight percent of the film or coating, and
mixing the hemicellulose, said at least one component, and said at least one agent;
partly solubilizing at least one of said hemicellulose, said at least one component and said at least one agent in water, wherein said mixing is carried out before or in conjunction with the forming of the film or coating, and wherein said solubilizing being carried out before or in conjunction with the forming of the film or coating, and
forming a film comprising a nanocomposite material comprising nanoparticulate platelets with the hemicellulose as a matrix.

21. A method comprising using a polymeric film or coating manufactured according to the method of claim 20 as an oxygen, aroma or grease barrier.

22. An aqueous film-forming composition comprising:
hemicellulose extracted from biomass;
at least one component to improve film-formability, the component selected from the group consisting of plasticizers, cellulose an oligomer and a polymer; and
at least one agent to increase the liquid/moisture resistance of a film or coating formed from the film-forming composition, wherein said at least one agent comprises a 2:1 layered phyllosilicate, and the film is a nanocomposite material comprising nanoparticulate platelets with the hemicellulose as a matrix, and wherein the component includes a plasticizer comprising a polyol, and an amount of the plasticizer is between 20% and 50% by weight of the hemicellulose;
the at least one agent to increase the liquid/moisture resistance includes a crosslinking agent in an amount between 0.5 and 5% by weight of the hemicellulose, the crosslinking agent including polyamidoamine-epichlorohydrin; and
the 2:1 layered phyllosilicate comprises montmorillonite in an amount between 2 and 8 weight percent of the film or coating.

* * * * *